(12) United States Patent
Li

(10) Patent No.: US 12,100,889 B2
(45) Date of Patent: Sep. 24, 2024

(54) MOBILE TERMINAL

(71) Applicant: VIVO MOBILE COMMUNICATION CO., LTD., Chang'an Dongguan (CN)

(72) Inventor: Rihui Li, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 424 days.

(21) Appl. No.: 17/357,085

(22) Filed: Jun. 24, 2021

(65) Prior Publication Data
US 2021/0320402 A1 Oct. 14, 2021

Related U.S. Application Data

(63) Continuation of application No. PCT/CN2019/123597, filed on Dec. 6, 2019.

(51) Int. Cl.
| | |
|---|---|
| *H01Q 1/36* | (2006.01) |
| *H01Q 1/24* | (2006.01) |
| *H01Q 1/48* | (2006.01) |
| *H01Q 21/30* | (2006.01) |
| *H04M 1/02* | (2006.01) |

(52) U.S. Cl.
CPC ............... *H01Q 1/36* (2013.01); *H01Q 1/243* (2013.01); *H01Q 1/48* (2013.01); *H01Q 21/30* (2013.01); *H04M 1/026* (2013.01)

(58) Field of Classification Search
CPC ............ H01Q 1/24; H01Q 1/243; H01Q 1/36; H01Q 1/38; H01Q 5/335; H01Q 21/30; H01Q 9/42
See application file for complete search history.

(56) References Cited

U.S. PATENT DOCUMENTS

| | | |
|---|---|---|
| 2011/0310572 A1 | 12/2011 | Murakami |
| 2017/0110786 A1 | 4/2017 | Liu |
| 2017/0346164 A1* | 11/2017 | Kim .................... H04M 1/0266 |
| 2018/0277930 A1 | 9/2018 | Martinez et al. |
| 2018/0366813 A1 | 12/2018 | Kim et al. |

(Continued)

FOREIGN PATENT DOCUMENTS

| | | |
|---|---|---|
| CN | 1671154 A | 9/2005 |
| CN | 1714469 A | 12/2005 |

(Continued)

OTHER PUBLICATIONS

International Search Report & Written Opinion related to Application No. PCT/CN2019/123597; reported on Jul. 8, 2021.

(Continued)

*Primary Examiner* — Jason M Crawford
(74) *Attorney, Agent, or Firm* — von Briesen & Roper, s.c.

(57) ABSTRACT

The present disclosure provides a mobile terminal. A first housing includes a first insulation region, a second insulation region and a third insulation region. A second housing includes a fourth insulation region, a fifth insulation region and a sixth insulation region. In a closed state, the first insulation region is at least partially opposite to the fourth insulation region, the second insulation region is at least partially opposite to the fifth insulation region, the third insulation region is at least partially opposite to the sixth insulation region, and the first antenna radiation branch is capacitively coupled to the second antenna radiation branch.

9 Claims, 2 Drawing Sheets

(56) References Cited

U.S. PATENT DOCUMENTS

| | | | | |
|---|---|---|---|---|
| 2019/0140342 A1* | 5/2019 | Lim | ........................ | H01Q 5/335 |
| 2020/0106177 A1* | 4/2020 | Zhou | ........................ | H01Q 5/378 |
| 2020/0245481 A1* | 7/2020 | Yoon | ........................ | G06F 1/1652 |
| 2021/0318720 A1* | 10/2021 | Lin | ........................ | H01Q 1/243 |
| 2021/0320402 A1* | 10/2021 | Li | ........................ | H04M 1/026 |
| 2021/0320410 A1* | 10/2021 | Liu | ........................ | H04B 1/3838 |
| 2021/0384626 A1* | 12/2021 | Li | ........................ | H01Q 9/42 |
| 2022/0115768 A1* | 4/2022 | Oh | ........................ | H01Q 9/42 |
| 2022/0223999 A1* | 7/2022 | Wu | ........................ | H01Q 1/42 |
| 2022/0311126 A1* | 9/2022 | Hou | ........................ | H01Q 5/335 |

FOREIGN PATENT DOCUMENTS

| | | |
|---|---|---|
| CN | 204391272 U | 6/2015 |
| CN | 106876897 A | 6/2017 |
| CN | 106921032 A | 7/2017 |
| CN | 108140928 A | 6/2018 |
| CN | 108292796 A | 7/2018 |
| CN | 108736140 A | 11/2018 |
| CN | 109728412 A | 5/2019 |
| WO | 2017183802 A1 | 10/2017 |

OTHER PUBLICATIONS

First Chinese Office Action for related Application No. 201811594159.5; reported on Feb. 21, 2020.

Extended European Search Report for related Application No. 19903997.5; reported on Dec. 21, 2021.

* cited by examiner

MOBILE TERMINAL

CROSS REFERENCE TO RELATED APPLICATIONS

This application is a continuation application of International Application No. PCT/CN2019/123597 filed on Dec. 6, 2019, which claims priority to Chinese Patent Application No. 201811594159.5, filed on Dec. 25, 2018 in china, both disclosures of which are incorporated herein by reference in their entireties.

TECHNICAL FIELD

The present disclosure relates to the field of communications technologies, and in particular, to a mobile terminal.

BACKGROUND

As users want large screens, mobile terminals with overlapped screens (for example, mobile phones with foldable screens) gradually enter people's lives. Mobile terminals with overlapped screens usually include the following two types: In one type of mobile terminal, a whole screen is folded in half by bending or pushed and pulled to form two cover bodies. In the other type of mobile terminal, two separate screens are folded in half or pushed and pulled to form two cover bodies. When the two cover bodies are opened, the two screens are on the same plane and piece together to form a large screen.

To meet user's requirement on the appearance of mobile terminals, mobile terminals with overlapped screens currently on the market usually use a metal housing. Meanwhile, an antenna radiation branch for radiating antenna energy is disposed on a housing of one cover body. When two cover bodies of the mobile terminal with the overlapped screen overlap, a metal housing of the other cover body is opposite to the antenna radiation branch. This greatly reduces antenna radiation space, resulting in a poor antenna radiation capability.

SUMMARY

The embodiments of the present disclosure provide a mobile terminal, to solve the problem that in a mobile terminal with an overlapped screen in related technologies, because a metal housing of the other cover body is opposite to an antenna radiation branch when two cover bodies overlap, this greatly reduces antenna radiation space, resulting in a poor antenna radiation capability.

To resolve the foregoing technical problem, the present disclosure is implemented as follows:

According to a first aspect, an embodiment of the present disclosure provides a mobile terminal, including a first housing and a second housing that can move relative to each other to a closed state in which the first housing and the second housing at least partially overlap:

the first housing includes a first conducting body and a first antenna radiation branch that are disposed at intervals, the first conducting body is grounded, the first antenna radiation branch is provided with a feeding point, the first antenna radiation branch is electrically connected to a matching circuit; a first insulation region is disposed between a first end of the first antenna radiation branch and the first conducting body, a second insulation region is disposed between a second end of the first antenna radiation branch and the first conducting body, and a third insulation region is disposed between a first side of the first antenna radiation branch and the first conducting body;

the second housing includes a second conducting body and a second antenna radiation branch that are disposed at intervals, the second conducting body is grounded, the second antenna radiation branch is provided with a first grounding point; a fourth insulation region is disposed between a first end of the second antenna radiation branch and the second conducting body, a fifth insulation region is disposed between a second end of the second antenna radiation branch and the second conducting body, and a sixth insulation region is disposed between a first side of the second antenna radiation branch and the second conducting body; and when the first housing and the second housing are in the closed state, the first antenna radiation branch is spaced from the second antenna radiation branch and the second conducting body, the second antenna radiation branch is spaced from the first conducting body, the first insulation region is at least partially opposite to the fourth insulation region, the second insulation region is at least partially opposite to the fifth insulation region, the third insulation region is at least partially opposite to the sixth insulation region, and the first antenna radiation branch is capacitively coupled to the second antenna radiation branch.

In the embodiments of the present disclosure, when the first housing and the second housing are in the closed state, the first insulation region is at least partially opposite to the fourth insulation region, the second insulation region is at least partially opposite to the fifth insulation region, and the third insulation region is at least partially opposite to the sixth insulation region. Therefore, when the first housing and the second housing are in the closed state, the second antenna radiation branch or the second antenna radiation branch and an insulation region is/are opposite to the first antenna radiation branch. In this way, reduction of antenna radiation space can be decreased, thereby improving the antenna radiation capability. At the same time, since the first antenna radiation branch is capacitively coupled to the second antenna radiation branch when the first housing and the second housing are in the closed state, the antenna energy radiated by the first antenna radiation branch can be transferred to the second antenna radiation branch through the capacitive coupling for further radiation. In this way, the antenna radiation capability can be further improved and antenna bandwidth can be increased.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
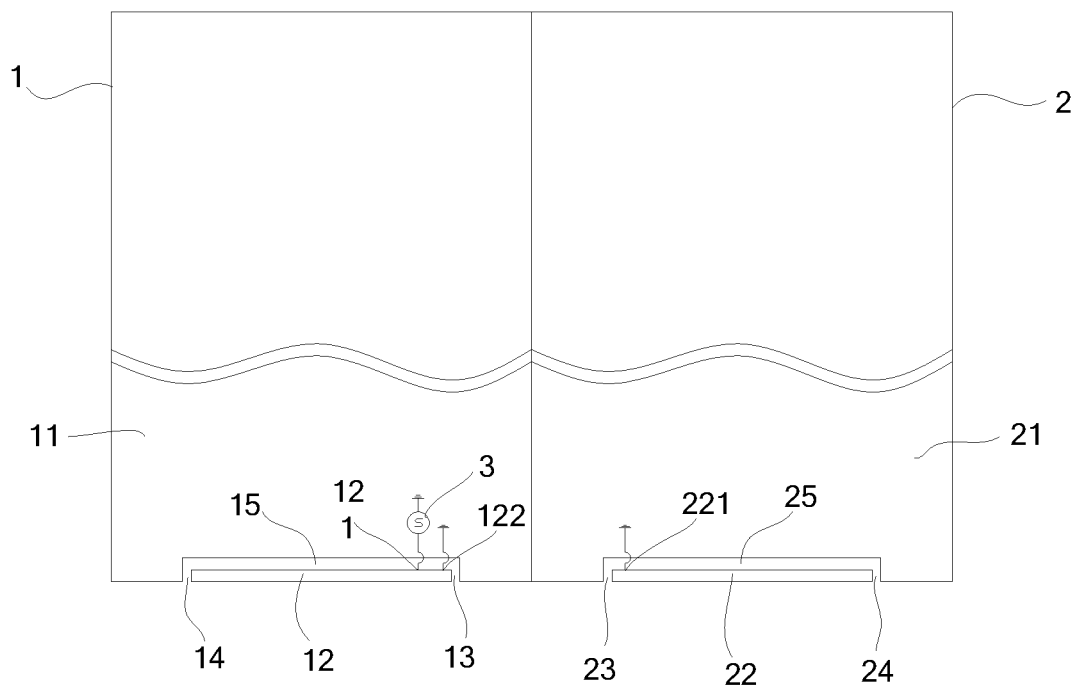
FIG. 1 is a first structural diagram of a mobile terminal according to an embodiment of the present disclosure.
Figure 2:
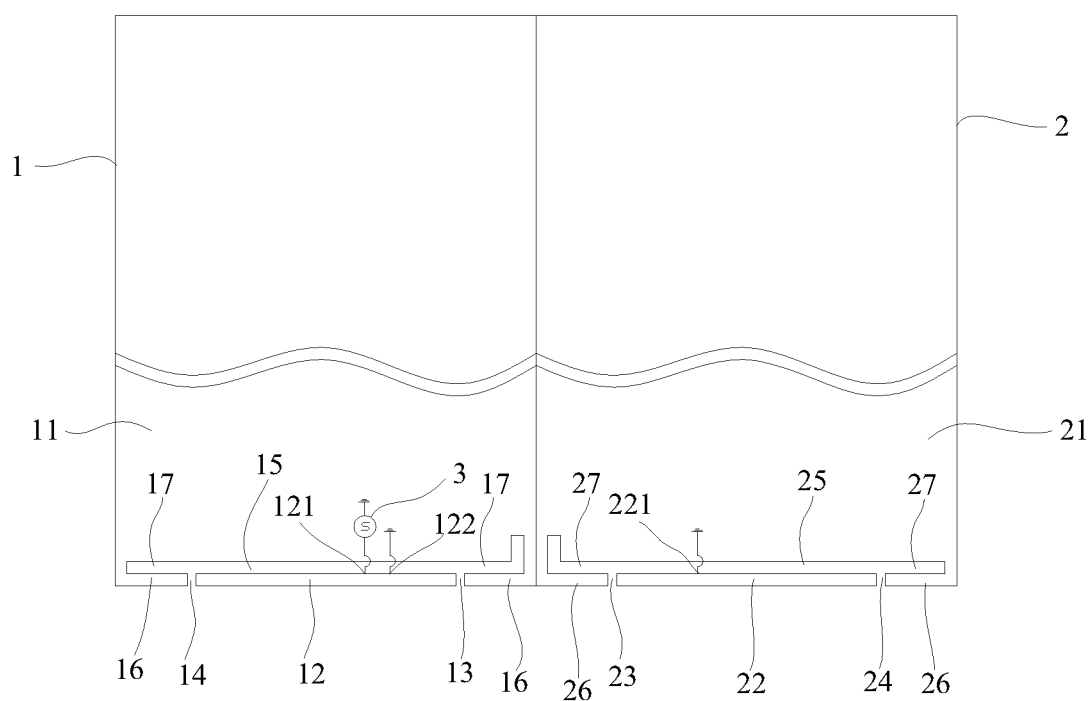
FIG. 2 is a second structural diagram of a mobile terminal according to an embodiment of the present disclosure.

As shown in FIG. 1 and FIG. 2, an embodiment of the present disclosure provides a mobile terminal, including a first housing 1 and a second housing 2 that can move relative to each other to a closed state in which the first housing and the second housing at least partially overlap;

the first housing 1 includes a first conducting body 11 and a first antenna radiation branch 12 that are disposed at intervals, the first conducting body 11 is grounded, the first antenna radiation branch 12 is provided with a feeding point 121, the first antenna radiation branch 12 is electrically connected to a matching circuit; a first insulation region 13 is disposed between a first end of the first antenna radiation branch 12 and the first conducting body 11, a second insulation region 14 is disposed between a second end of the first antenna radiation branch 12 and the first conducting body 11, and a third insulation region 15 is disposed between a first side of the first antenna radiation branch 12 and the first conducting body 11;

the second housing 2 includes a second conducting body 21 and a second antenna radiation branch 22 that are disposed at intervals, the second conducting body 21 is grounded, the second antenna radiation branch 22 is provided with a first grounding point 221; a fourth insulation region 23 is disposed between a first end of the second antenna radiation branch 22 and the second conducting body 21, a fifth insulation region 24 is disposed between a second end of the second antenna radiation branch 22 and the second conducting body 21, and a sixth insulation region 25 is disposed between a first side of the second antenna radiation branch 22 and the second conducting body 21; and when the first housing 1 and the second housing 2 are in the closed state, the first antenna radiation branch 12 is spaced from the second antenna radiation branch 22 and the second conducting body 21, the second antenna radiation branch 22 is spaced from the first conducting body 11, the first insulation region 13 is at least partially opposite to the fourth insulation region 23, the second insulation region 14 is at least partially opposite to the fifth insulation region 24, the third insulation region 15 is at least partially opposite to the sixth insulation region 25, and the first antenna radiation branch 12 is capacitively coupled to the second antenna radiation branch 22.

The mobile terminal may be a mobile phone, a tablet personal computer (Tablet Personal Computer), a laptop computer (Laptop Computer), a personal digital assistant (personal digital assistant, PDA), a mobile Internet device (Mobile Internet Device, MID), a wearable device (Wearable Device), or the like.

The first housing 1 and the second housing 2 can be connected by a shaft, or can be connected by a sliding rail or a sliding groove. When the first housing 1 and the second housing 2 are connected by a shaft, the first housing 1 and the second housing 2 can move, through folding, relative to each other to the closed state in which the first housing 1 and the second housing 2 at least partially overlap. When the first housing 1 and the second housing 2 are connected by a sliding rail, the first housing 1 and the second housing 2 can move, through sliding (for example, sliding towards left or right or sliding upwards or downwards), relative to each other to the closed state in which the first housing 1 and the second housing 2 at least partially overlap.

A material of the first antenna radiation branch 12 can be any conducting body, for example, copper, stainless steel, magnesium alloy, aluminum alloy, or the like. A material of the second antenna radiation branch 22 can be any conducting body, for example, copper, stainless steel, magnesium alloy, aluminum alloy, or the like. The feeding point 121 can be electrically connected to a signal source 3. The signal source 3 can be a radio frequency module based on the 2-Generation wireless telephone technology (2-Generation wireless telephone technology, 2G), the 3rd-Generation mobile communication technology (3rd-Generation mobile communication technology, 3G), the 4th Generation mobile communication technology (the 4th Generation mobile communication technology, 4G), the 5th-Generation mobile communication technology (5th-Generation mobile communication technology, 5G), wireless fidelity (Wireless-Fidelity, WIFI), or Global Positioning System (Global Positioning System, GPS).

The first antenna radiation branch 12 is electrically connected to the matching circuit in at least one of the following manners: in a first manner, the matching circuit is connected between the feeding point 121 and the signal source 3, that is, the feeding point 121 is electrically connected to the signal source 3 through the matching circuit; in a second manner, a connection point 122 is additionally disposed on the first antenna radiation branch 12, the matching circuit is electrically connected to the connection point 122, and the matching circuit is grounded. It should be noted that the matching circuit herein can include an inductor and/or a capacitor, or include multiple switches and multiple inductors and/or capacitors, or include only a conducting wire. When the matching circuit herein includes only a conducting wire, "the matching circuit is electrically connected to the connection point 122, and the matching circuit is grounded" in the second manner can be understood as "the connection point 122 is directly grounded". The first grounding point 221 can be electrically connected to reference ground, that is, for grounding.

The insulation region may also be referred to as an electrical insulation region; and each of the insulation regions may be filled with a non-metallic material (for example, plastic). It should be noted that to further improve space utilization, in some optional solutions, each of the insulation regions is embedded with a grounded metal part or an ungrounded metal part, such as a speaker, a camera, or a USB, and there is a gap between the metal part and the antenna radiation branch. Being at least partially opposite to can be understood as being at least partially aligned.

A resonance frequency of the first antenna radiation branch 12 and a resonance frequency of the second antenna radiation branch 22 may be the same or different. For example, the first antenna radiation branch 12 may resonate in a high frequency band (2.3 GHz to 2.69 GHz) or an intermediate frequency band (1.71 GHz to 2.17 GHz), and the second antenna radiation branch 22 may resonate in a low frequency band (0.7 GHz to 0.96 GHz). In addition, the first antenna radiation branch 12 can resonate in one frequency band or multiple frequency bands; and the second antenna radiation branch 22 can resonate in one frequency band or multiple frequency bands. This is not limited in the embodiments of the present disclosure.

In the embodiments of the present disclosure, when the first housing and the second housing are in the closed state, the first insulation region is at least partially opposite to the fourth insulation region, the second insulation region is at least partially opposite to the fifth insulation region, and the third insulation region is at least partially opposite to the sixth insulation region. Therefore, when the first housing and the second housing are in the closed state, the second antenna radiation branch or the second antenna radiation branch and an insulation region is/are opposite to the first antenna radiation branch. In this way, reduction of antenna radiation space can be decreased, thereby improving the antenna radiation capability. At the same time, since the first antenna radiation branch is capacitively coupled to the second antenna radiation branch when the first housing and the second housing are in the closed state, the antenna energy radiated by the first antenna radiation branch can be transferred to the second antenna radiation branch through the capacitive coupling for further radiation. In this way, the antenna radiation capability can be further improved and antenna bandwidth can be increased.

Figure 3:
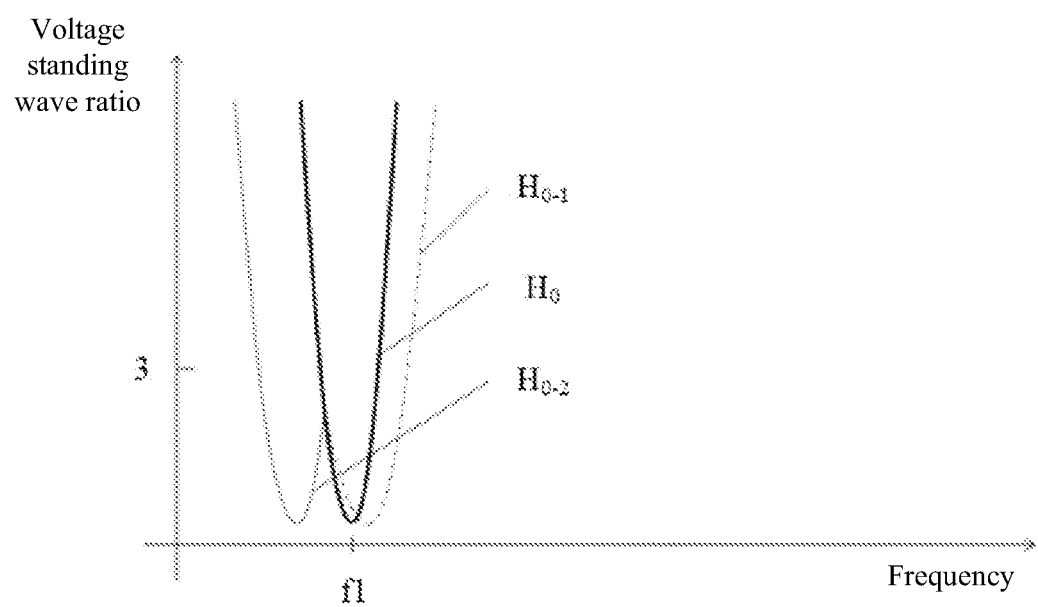
FIG. 3 is an exemplary diagram of a mobile terminal according to an embodiment of the present disclosure.

To have more intuitive explanation of beneficial technical effects of the embodiments of the present disclosure, an example is used herein. Referring to FIG. 3, FIG. 3 is a schematic diagram of comparing antenna resonance modes generated by the mobile terminal in the related technology and the mobile terminal shown in FIG. 1 when the first housing and the second housing are in the closed state. $H_0$ represents an antenna resonance mode generated by the mobile terminal in the related technology when the first housing and the second housing of the mobile terminal are in the closed state. $H_{0-1}$ represents an antenna resonance mode generated by the first antenna radiation branch 12 of the mobile terminal shown in FIG. 1 when the first housing 1 and the second housing 2 of the mobile terminal are in the closed state. $H_{0-2}$ represents an antenna resonance mode generated by the second antenna radiation branch 22 of the mobile terminal shown in FIG. 1 when the first housing 1 and the second housing 2 of the mobile terminal are in the closed state.

As can be seen from FIG. 3, in the mobile terminal shown in FIG. 1, the first antenna radiation branch 12 generates the antenna resonance mode $H_{0-1}$ corresponding to the antenna resonance mode $H_0$. In addition, the second antenna radiation branch 22 additionally generates the antenna resonance mode $H_{0-2}$. The total bandwidth of the antenna resonance mode $H_{0-1}$ and the antenna resonance mode $H_{0-2}$ is greater than the bandwidth of the antenna resonance mode $H_0$. This indicates that the antenna bandwidth of the mobile terminal shown in FIG. 1 is wider than the antenna bandwidth of the mobile terminal in the related technology, and the mobile terminal shown in FIG. 1 has a better radiation capability. In addition, as shown in FIG. 3, the bandwidth of the antenna resonance mode $H_{0-1}$ is wider than the bandwidth of the antenna resonance mode $H_0$. This indicates that the second antenna radiation branch 22 further can increase radiation space of the first antenna radiation branch 12, and can improve the radiation capability of the first antenna radiation branch 12.

Optionally, the first grounding point 221 is grounded through a tuning element; and/or the feeding point 121 is located at the first end of the first antenna radiation branch 12, and the first grounding point 221 is located at the first end of the second antenna radiation branch 22.

The tuning element can be configured in a fixed manner, for example, 0 ohm resistor, inductor, or capacitor, or a fixed configuration under control of multiple switches, or a variable capacitor, or the like. The feeding point 121 can be connected to the signal source 3 through a spring, a screw, a flexible printed circuit (Flexible Printed Circuit, FPC), or the like.

In this way, since the first grounding point is grounded through the tuning element, the resonance frequency of the second antenna radiation branch can be adjusted.

The feeding point is disposed at the first end of the first antenna radiation branch and the first grounding point is disposed at the first end of the second antenna radiation branch, so that a frequency of the resonance mode of the second antenna radiation branch can be closer to a frequency of the resonance mode generated by the first antenna radiation branch, thereby improving the antenna radiation capability.

Optionally, when the first housing and the second housing are in the closed state, the first insulation region 13 and the fourth insulation region 23 are aligned with each other, and/or the second insulation region 14 and the fifth insulation region 24 are aligned with each other, and/or the third insulation region 15 and the sixth insulation region 25 are aligned with each other.

In this way, when the first insulation region and the fourth insulation region are aligned with each other, an end surface of the first end of the first antenna radiation branch and an end surface of the first end of the second antenna radiation branch are also aligned. Therefore, both interference of the second conducting body to the first antenna radiation branch and interference of the first conducting body to the second antenna radiation branch can be further reduced. At the same time, the effect of coupling between the first antenna radiation branch and the second antenna radiation branch can also be improved, thereby further improving the antenna radiation capability. In addition, the appearance of the mobile terminal can be more symmetrical and tidy.

When the second insulation region and the fifth insulation region are aligned with each other, an end surface of the second end of the first antenna radiation branch and an end surface of the second end of the second antenna radiation branch are also aligned. Therefore, both interference of the second conducting body to the first antenna radiation branch and interference of the first conducting body to the second antenna radiation branch can be further reduced. At the same time, the effect of coupling between the first antenna radiation branch and the second antenna radiation branch can also be improved, thereby further improving the antenna radiation capability. In addition, the appearance of the mobile terminal can be more symmetrical and tidy.

When the third insulation region and the sixth insulation region are aligned with each other, the first side of the first antenna radiation branch and the first side of the second antenna radiation branch are also aligned. Therefore, both interference of the second conducting body to the first antenna radiation branch and interference of the first conducting body to the second antenna radiation branch can be reduced. At the same time, the effect of coupling between the first antenna radiation branch and the second antenna radiation branch can also be improved, thereby improving the antenna radiation capability. In addition, the appearance of the mobile terminal can be more symmetrical and tidy.

Optionally, a ratio of a length of the second antenna radiation branch 22 to a length of the first antenna radiation branch 12 is between two-thirds and four-thirds.

Optionally, when the first housing 1 and the second housing 2 are in the closed state, the first antenna radiation branch 12 and the second antenna radiation branch 22 are aligned with each other.

When the first housing 1 and the second housing 2 are in the closed state, the first antenna radiation branch 12 and the second antenna radiation branch 22 are aligned with each other. This can be understood as that the shape and the size of the first antenna radiation branch 12 are the same as those of the second antenna radiation branch 22. In addition, when the first housing 1 and the second housing 2 are in the closed state, the first antenna radiation branch 12 and the second antenna radiation branch 22 are completely aligned.

When the first housing and the second housing are in the closed state, the first antenna radiation branch and the second antenna radiation branch are aligned with each other. Therefore, both interference of the second conducting body to the first antenna radiation branch and interference of the first conducting body to the second antenna radiation branch can be further reduced, thereby further improving the antenna radiation capability. At the same time, the effect of coupling between the first antenna radiation branch and the second antenna radiation branch can also be improved, thereby further improving the antenna radiation capability. In addition, the appearance of the mobile terminal can be more symmetrical and tidy.

Optionally, a width of the first insulation region and a width of the second insulation region are both between 0.3 mm and 3 mm, and a width of the third insulation region is between 0.3 mm and 8 mm; and/or
    a width of the fourth insulation region and a width of the fifth insulation region are both between 0.3 mm and 3 mm, and a width of the sixth insulation region is between 0.3 mm and 8 mm; and/or
    a width of the fourth insulation region is greater than or equal to a width of the first insulation region, a width of the fifth insulation region is greater than or equal to a width of the second insulation region, and a width of the sixth insulation region is greater than or equal to a width of the third insulation region; and/or
    when the first housing and the second housing are in the closed state, the first antenna radiation branch and the second antenna radiation branch are spaced by 0.3 mm to 2 mm.

The width of the first insulation region 13 may refer to a distance between the first end of the first antenna radiation branch 12 and the first conducting body 11 in an extending direction of the first antenna radiation branch 12. The width of the first insulation region 13 is between 0.3 mm and 3 mm, which may be that the width of the first insulation region 13 is greater than or equal to 0.3 mm and less than or equal to 3 mm, for example, is 1.2 mm. The width of the second insulation region 14 may refer to a distance between the second end of the first antenna radiation branch 12 and the first conducting body 11 in an extending direction of the first antenna radiation branch 12. The width of the second insulation region 14 is between 0.3 mm and 3 mm, which may be that the width of the second insulation region 14 is greater than or equal to 0.3 mm and less than or equal to 3 mm, for example, is 1.2 mm. The width of the third insulation region 15 may refer to a distance between the first side of the first antenna radiation branch 12 and the first conducting body 11 perpendicular to an extending direction of the first antenna radiation branch 12. The width of the third insulation region 15 is between 0.3 mm and 8 mm, which may be that the width of the third insulation region 15 is greater than or equal to 0.3 mm and less than or equal to 8 mm, for example, is 1.5 mm.

The width of the fourth insulation region 23 may refer to a distance between the first end of the second antenna radiation branch 22 and the second conducting body 21 in an extending direction of the second antenna radiation branch 22. The width of the fourth insulation region 23 is between 0.3 mm and 3 mm, which may be that the width of the fourth insulation region 23 is greater than or equal to 0.3 mm and less than or equal to 3 mm, for example, is 1.2 mm. The width of the fifth insulation region 24 may refer to a distance between the second end of the second antenna radiation branch 22 and the second conducting body 21 in an extending direction of the second antenna radiation branch 22. The width of the fifth insulation region 24 is between 0.3 mm and 3 mm, which may be that the width of the fifth insulation region 24 is greater than or equal to 0.3 mm and less than or equal to 3 mm, for example, is 1.2 mm. The width of the sixth insulation region 15 may refer to a distance between the first side of the second antenna radiation branch 22 and the second conducting body 21 perpendicular to an extending direction of the second antenna radiation branch 22. The width of the sixth insulation region 15 is between 0.3 mm and 8 mm, which may be that the width of the sixth insulation region 15 is greater than or equal to 0.3 mm and less than or equal to 8 mm, for example, is 1.5 mm.

The first antenna radiation branch 12 is spaced from the second antenna radiation branch 22 by 0.3 mm to 2 mm, which may be that the interval between the first antenna radiation branch 12 and the second antenna radiation branch 22 is greater than or equal to 0.3 mm and less than or equal to 2 mm, for example, is 0.5 mm.

In this way, since the widths of the first insulation region and the second insulation region are both between 0.3 mm and 3 mm and the width of the third insulation region is between 0.3 mm and 8 mm, the radiation capability of the first antenna radiation branch can be better and the appearance of the first housing can be better.

Since the widths of the fourth insulation region and the fifth insulation region are both between 0.3 mm and 3 mm and the width of the sixth insulation region is between 0.3 mm and 8 mm, the radiation capability of the second antenna radiation branch can be better and the appearance of the second housing can be better.

Because the width of the fourth insulation region is greater than or equal to a width of the first insulation region, the width of the fifth insulation region is greater than or equal to a width of the second insulation region, and the width of the sixth insulation region is greater than or equal to a width of the third insulation region, the radiation capability of the second antenna radiation branch can be better.

When the first housing and the second housing are in the closed state, the first antenna radiation branch is spaced from the second antenna radiation branch by 0.3 mm to 2 mm. Therefore, the effect of coupling between the first antenna radiation branch and the second antenna radiation branch can be better, thereby further improving the antenna radiation capability. In addition, the appearance of the mobile terminal can be better when the first housing and the second housing are in the closed state.

Optionally, the first antenna radiation branch 12 is divided into two first antenna arms by the feeding point 121, and the second antenna radiation branch 22 is divided into two second antenna arms by the first grounding point 221.

The first housing 1 further includes:
    a third antenna radiation branch 16 electrically connected to the first conducting body 11, where the third antenna radiation branch 16 is at least partially opposite to a first target antenna arm of the two first antenna arms;
    when the third antenna radiation branch 16 is disposed at a position close to the first end of the first antenna radiation branch 12, the first insulation region 13 is formed between the third antenna radiation branch 16 and the first end of the first antenna radiation branch 12;

when the third antenna radiation branch 16 is disposed at a position close to a second end of the first antenna radiation branch 12, the second insulation region 14 is formed between the third antenna radiation branch 16 and the second end of the first antenna radiation branch 12;

a seventh insulation region 17 is provided between the first side of the third antenna radiation branch 16 and the first conducting body 11, and the third antenna radiation branch 12 is capacitively coupled to the first target antenna arm;

the second housing 2 further includes:

a fourth antenna radiation branch 26 electrically connected to the second conducting body 21, where the fourth antenna radiation branch 26 is at least partially opposite to a second target antenna arm of the two second antenna arms;

when the fourth antenna radiation branch 26 is disposed at a position close to the first end of the second antenna radiation branch 22, a fourth insulation region 23 is formed between the fourth antenna radiation branch 26 and the first end of the second antenna radiation branch 22;

when the fourth antenna radiation branch 26 is disposed at a position close to a second end of the second antenna radiation branch 22, the fifth insulation region 24 is formed between the fourth antenna radiation branch 26 and the second end of the second antenna radiation branch 22;

an eighth insulation region 27 is provided between the first side of the fourth antenna radiation branch 26 and the second conducting body 21, and the fourth antenna radiation branch 26 is capacitively coupled to the second target antenna arm; and when the first housing 1 and the second housing 2 are in the closed state, there is a gap between each two of the first antenna radiation branch 12, the second antenna radiation branch 22, the third antenna radiation branch 16, and the fourth antenna radiation branch 26, there is a gap between the third antenna radiation branch 16 and the second conducting body 21, there is a gap between the fourth antenna radiation branch 26 and the first conducting body 11, the seventh insulation region 17 is at least partially opposite to the eighth insulation region 27, and the third antenna radiation branch 16 is capacitively coupled to the fourth antenna radiation branch 26.

The lengths of the two first antenna arms may be the same or different. When the lengths of the two first antenna arms are different, one of the first antenna arms can be used to generate a low-frequency resonance mode, and the other first antenna arm can be used to generate a high-frequency resonance mode. The first target antenna arm can be either of the two first antenna arms.

The lengths of the two second antenna arms may be the same or different. When the lengths of the two second antenna arms are different, one of the second antenna arms can be used to generate a low-frequency resonance mode, and the other second antenna arm can be used to generate a high-frequency resonance mode. The second target antenna arm can be either of the two second antenna arms.

The third antenna radiation branch 16 can be used to generate an intermediate-frequency resonance mode; and the fourth antenna radiation branch 26 can be used to generate a high-frequency resonance mode. It should be noted that each of the antenna radiation branches may be used to generate a resonance frequency in a frequency band as required, and this is not limited in the embodiments of the present disclosure.

The number of third antenna radiation branches 16 may be one, two, or more. As shown in FIG. 2, when the number of third antenna radiation branches 16 is two, one of the third antenna radiation branches 16 may be at least partially opposite to one first antenna arm, and the other third antenna radiation branch 16 is at least partially opposite to the other first antenna arm.

The number of fourth antenna radiation branches 26 may be one, two, or more. As shown in FIG. 2, when the number of fourth antenna radiation branches 26 is two, one of the fourth antenna radiation branches 26 may be at least partially opposite to one second antenna arm, and the other fourth antenna radiation branch 26 is at least partially opposite to the other second antenna arm.

In this way, radiation space of the first antenna radiation branch can be further expanded by adding the third antenna radiation branch, and radiation space of the second antenna radiation branch can be further expanded by adding the fourth antenna radiation branch. In addition, when the first housing and the second housing are in the closed state, the third antenna radiation branch can also be capacitively coupled to the fourth antenna radiation branch, which can further improve the antenna radiation capability and increase antenna bandwidth.

Optionally, the first end of the third antenna radiation branch 16 and the first end of the first target antenna arm are aligned with each other; and/or the first end of the fourth antenna radiation branch 26 and the first end of the second target antenna arm are aligned with each other; and/or when the first housing 1 and the second housing 2 are in the closed state, the third antenna radiation branch 16 and the fourth antenna radiation branch 26 are aligned with each other.

Because the end surface of the third antenna radiation branch and an end surface of the first target antenna arm are aligned with each other, the effect of coupling between the third antenna radiation branch and the first target antenna arm can also be improved, thereby further improving the antenna radiation capability. In addition, the appearance of the mobile terminal can be more tidy.

Because the end surface of the fourth antenna radiation branch and an end surface of the second target antenna arm are aligned with each other, the effect of coupling between the fourth antenna radiation branch and the second target antenna arm can also be improved, thereby further improving the antenna radiation capability. In addition, the appearance of the mobile terminal can be more tidy.

When the first housing and the second housing are in the closed state, the third antenna radiation branch and the fourth antenna radiation branch are aligned with each other. Therefore, both interference of the second conducting body to the third antenna radiation branch and interference of the first conducting body to the fourth antenna radiation branch can be further reduced. At the same time, the effect of coupling between the third antenna radiation branch and the fourth antenna radiation branch can also be improved, thereby further improving the antenna radiation capability. In addition, the appearance of the mobile terminal can be more symmetrical and tidy.

Optionally, when the first housing 1 and the second housing 2 are in the closed state, the seventh insulation region 17 and the eighth insulation region 27 are aligned with each other.

In this way, when the seventh insulation region and the eighth insulation region are aligned with each other, the first side of the third antenna radiation branch and the first side of the fourth antenna radiation branch are also aligned. Therefore, both interference of the second conducting body to the third antenna radiation branch and interference of the first conducting body to the fourth antenna radiation branch can be further reduced. At the same time, the effect of coupling between the third antenna radiation branch and the fourth antenna radiation branch can also be improved, thereby further improving the antenna radiation capability. In addition, the appearance of the mobile terminal can be more symmetrical and tidy.

Optionally, a width of the seventh insulation region 17 is between 0.3 mm and 8 mm; and/or
    a width of the eighth insulation region 27 is between 0.3 mm and 8 mm; and/or
    when the first housing 1 and the second housing 2 are in the closed state, the third antenna radiation branch 16 and the fourth antenna radiation branch 26 are spaced by 0.3 mm to 2 mm.

The width of the seventh insulation region 17 may refer to a distance between the first side of the third antenna radiation branch 16 and the first conducting body 11 perpendicular to an extending direction of the third antenna radiation branch 16. The width of the seventh insulation region 17 is between 0.3 mm and 3 mm, which may be that the width of the seventh insulation region 17 is greater than or equal to 0.3 mm and less than or equal to 3 mm, for example, is 1.2 mm. The width of the eighth insulation region 27 may refer to a distance between the first side of the fourth antenna radiation branch 26 and the second conducting body 21 perpendicular to an extending direction of the fourth antenna radiation branch 26. The width of the eighth insulation region 27 is between 0.3 mm and 3 mm, which may be that the width of the eighth insulation region 27 is greater than or equal to 0.3 mm and less than or equal to 3 mm, for example, is 1.2 mm. The third antenna radiation branch 16 is spaced from the fourth antenna radiation branch 26 by 0.3 mm to 2 mm, which may be that the interval between the third antenna radiation branch 16 and the fourth antenna radiation branch 26 is greater than or equal to 0.3 mm and less than or equal to 2 mm, for example, is 0.5 mm.

Optionally, the third antenna radiation branch 16 is in a straight or L shape; and/or
    the fourth antenna radiation branch 26 is in a straight or L shape; and/or
    a ratio of a length of the fourth antenna radiation branch 26 to a length of the third antenna radiation branch 16 is between two-thirds and four-thirds, for example, the ratio of the length of the fourth antenna radiation branch 26 to the length of the third antenna radiation branch 16 is 1.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A mobile terminal, comprising a first housing and a second housing that can move relative to each other to a closed state in which the first housing and the second housing at least partially overlap:
    the first housing comprises a first conducting body and a first antenna radiation branch that are disposed at intervals, the first conducting body is grounded, the first antenna radiation branch is provided with a feeding point, the first antenna radiation branch is electrically connected to a matching circuit; a first insulation region is disposed between a first end of the first antenna radiation branch and the first conducting body, a second insulation region is disposed between a second end of the first antenna radiation branch and the first conducting body, and a third insulation region is disposed between a first side of the first antenna radiation branch and the first conducting body;
    the second housing comprises a second conducting body and a second antenna radiation branch that are disposed at intervals, the second conducting body is grounded, the second antenna radiation branch is provided with a first grounding point; a fourth insulation region is disposed between a first end of the second antenna radiation branch and the second conducting body, a fifth insulation region is disposed between a second end of the second antenna radiation branch and the second conducting body, and a sixth insulation region is disposed between a first side of the second antenna radiation branch and the second conducting body; and
    when the first housing and the second housing are in the closed state, the first antenna radiation branch is spaced from the second antenna radiation branch and the second conducting body, the second antenna radiation branch is spaced from the first conducting body, the first insulation region is at least partially opposite to the fourth insulation region, the second insulation region is at least partially opposite to the fifth insulation region, the third insulation region is at least partially opposite to the sixth insulation region, and the first antenna radiation branch is capacitively coupled to the second antenna radiation branch;
wherein
the first antenna radiation branch is divided into two first antenna arms by the feeding point, and the second antenna radiation branch is divided into two second antenna arms by the first grounding point;
the first housing further comprises:
a third antenna radiation branch electrically connected to the first conducting body, wherein the third antenna radiation branch is at least partially opposite to a first target antenna arm of the two first antenna arms;
when the third antenna radiation branch is disposed at a position close to the first end of the first antenna radiation branch, the first insulation region is formed between the third antenna radiation branch and the first end of the first antenna radiation branch;
when the third antenna radiation branch is disposed at a position close to a second end of the first antenna radiation branch, the second insulation region is formed between the third antenna radiation branch and the second end of the first antenna radiation branch;
a seventh insulation region is provided between the first side of the third antenna radiation branch and the first conducting body, and the third antenna radiation branch is capacitively coupled to the first target antenna arm;
the second housing further comprises:

a fourth antenna radiation branch electrically connected to the second conducting body, wherein the fourth antenna radiation branch is at least partially opposite to a second target antenna arm of the two second antenna arms;

when the fourth antenna radiation branch is disposed at a position close to the first end of the second antenna radiation branch a fourth insulation region is formed between the fourth antenna radiation branch and the first end of the second antenna radiation branch;

when the fourth antenna radiation branch is disposed at a position close to a second end of the second antenna radiation branch the fifth insulation region is formed between the fourth antenna radiation branch and the second end of the second antenna radiation branch;

an eighth insulation region is provided between the first side of the fourth antenna radiation branch and the second conducting body, and the fourth antenna radiation branch is capacitively coupled to the second target antenna arm; and when the first housing and the second housing are in the closed state, there is a gap between each two of the first antenna radiation branch, the second antenna radiation branch the third antenna radiation branch, and the fourth antenna radiation branch, there is a gap between the third antenna radiation branch and the second conducting body, there is a gap between the fourth antenna radiation branch and the first conducting body, the seventh insulation region is at least partially opposite to the eighth insulation region, and the third antenna radiation branch s capacitively coupled to the fourth antenna radiation branch.

2. The mobile terminal according to claim 1, wherein when the first housing and the second housing are in the closed state, the first insulation region and the fourth insulation region are aligned with each other, and/or the second insulation region and the fifth insulation region are aligned with each other, and/or the third insulation region and the sixth insulation region are aligned with each other.

3. The mobile terminal according to claim 1, wherein when the first housing and the second housing are in the closed state, the first antenna radiation branch and the second antenna radiation branch are aligned with each other.

4. The mobile terminal according to claim 1, wherein a width of the first insulation region and a width of the second insulation region are both between 0.3 mm and 3 mm, and a width of the third insulation region is between 0.3 mm and 8 mm; and/or a width of the fourth insulation region and a width of the fifth insulation region are both between 0.3 mm and 3 mm, and a width of the sixth insulation region is between 0.3 mm and 8 mm; and/or a width of the fourth insulation region is greater than or equal to a width of the first insulation region, a width of the fifth insulation region is greater than or equal to a width of the second insulation region, and a width of the sixth insulation region is greater than or equal to a width of the third insulation region; and/or when the first housing and the second housing are in the closed state, the first antenna radiation branch and the second antenna radiation branch are spaced by 0.3 mm to 2 mm.

5. The mobile terminal according to claim 1, wherein the first end of the third antenna radiation branch and the first end of the first target antenna arm are aligned with each other; and/or the first end of the fourth antenna radiation branch and the first end of the second target antenna arm are aligned with each other; and/or when the first housing and the second housing are in the closed state, the third antenna radiation branch and the fourth antenna radiation branch are aligned with each other.

6. The mobile terminal according to claim 1, wherein when the first housing and the second housing are in the closed state, the seventh insulation region and the eighth insulation region are aligned with each other.

7. The mobile terminal according to claim 1, wherein a width of the seventh insulation region is between 0.3 mm and 8 mm; and/or a width of the eighth insulation region is between 0.3 mm and 8 mm; and/or when the first housing and the second housing are in the closed state, the third antenna radiation branch and the fourth antenna radiation branch are spaced by 0.3 mm to 2 mm.

8. The mobile terminal according to claim 1, wherein the third antenna radiation branch is in a straight or L shape; and/or the fourth antenna radiation branch is in a straight or L shape; and/or a ratio of a length of the fourth antenna radiation branch to a length of the third antenna radiation branch is between two-thirds and four-thirds.

9. The mobile terminal according to claim 1, wherein the first grounding point is grounded through a tuning element; and/or the feeding point is located at the first end of the first antenna radiation branch, and the first grounding point is located at the first end of the second antenna radiation branch.

* * * * *